United States Patent [19]

Kroll et al.

[11] Patent Number: 4,773,807
[45] Date of Patent: Sep. 27, 1988

[54] HIGH-SPEED AUTOMATIC STORAGE AND RETRIEVAL SYSTEM AND APPARATUS THEREFOR

[75] Inventors: Charles R. Kroll, Delafield; John Briggs, New Berlin; Keith O. Jurkowski, Waukesha; Eric C. Blom, Milwaukee, all of Wis.

[73] Assignee: Harnischfeger Engineers, Inc., Brookfield, Wis.

[21] Appl. No.: 858,061

[22] Filed: Apr. 30, 1986

[51] Int. Cl.⁴ ............................................... B65G 1/06
[52] U.S. Cl. .................................... 414/282; 414/286; 414/266; 414/279; 414/280
[58] Field of Search ............... 414/266, 267, 268, 269, 414/270, 271, 272, 273, 274, 275, 276, 277, 278, 279, 280, 281, 282, 283, 284, 285, 286, 222, 252, 253, 255, 259, 260, 261, 262, 609, 347

[56] References Cited

U.S. PATENT DOCUMENTS

| | | | |
|---|---|---|---|
| 1,369,393 | 2/1921 | Burgess | 414/281 |
| 3,622,020 | 11/1971 | Sarvary | 414/279 |
| 3,779,403 | 12/1973 | Young | 414/279 |
| 3,951,277 | 4/1976 | Hegelman | 414/280 |

FOREIGN PATENT DOCUMENTS

| | | | |
|---|---|---|---|
| 156795 | 9/1982 | German Democratic Rep. | 414/266 |
| 1051192 | 2/1959 | Fed. Rep. of Germany | 414/286 |
| 2114705 | 10/1971 | Fed. Rep. of Germany | 414/282 |
| 2113202 | 10/1972 | Fed. Rep. of Germany | 414/282 |
| 2843201 | 4/1980 | Fed. Rep. of Germany | 414/279 |
| 3343858 | 6/1985 | Fed. Rep. of Germany | 414/278 |
| 44978 | 4/1977 | Japan | 414/266 |

*Primary Examiner*—Frank E. Werner
*Attorney, Agent, or Firm*—Richard C. Ruppin

[57] ABSTRACT

An elevated track network guides self-propelled guided vehicles (with containers thereon) from an entry location where objects enter the system, to a storage zone defined by sets of compartmentalized storage racks wherein containers filled with objects are temporarily stored, and from thence to an exit location where retrieved objects leave the system. Each set of storage racks comprise four racks and two aisles, with two of the racks arranged back-to-back between the aisles and the other two racks on opposite sides of the aisles. Each storage rack comprises storage compartments arranged in horizontal rows and vertical columns. A track in the track network extends through and along an intermediate row in one of the back-to-back racks (pre-empting the compartments in that row). Each aisle accommodates a self-propelled aisle crane which services the racks on both sides of the aisle. Each crane comprises a chassis movable along its aisle to any column, a carriage vertically movable on the chassis to any row, and an extendable/retractable shuttle on the carriage for storing and retrieving objects in the compartments. The shuttle has a "home position" intermediate the opposite ends of its associated racks and intermediate the tops and bottoms of those racks. A guided vehicle is directed to an unloading/loading zone on the track, which zone is adjacent the shuttle's home position and whereat objects can be exchanged between the guided vehicle and the shuttle when the latter is extended. In one embodiment the loading zone has two regions, each accessible to only one shuttle. One region is on the track and the other region is on a short spur track switchably connected to the main track inside a portion of the adjacent row of the other of the two back-to-back racks. In a second embodiment the same loading zone is accessible to both shuttles. In a third embodiment two separate tracks and loading zones are provided, one for each aisle crane. Control means operate the guided vehicles, aisle cranes and shuttles in desired sequences.

14 Claims, 8 Drawing Sheets

HIGH-SPEED AUTOMATIC STORAGE AND RETRIEVAL SYSTEM AND APPARATUS THEREFOR

BACKGROUND OF THE INVENTION

1. Field of Use

This invention relates generally to high-speed automatic storage and retrieval systems (AS/RS) which employ stationary storage racks, aisle cranes (AS/R), automatic guided vehicles (AGV), and control means therefor.

2. Description of the Prior Art

Such systems are used in factories and warehouses to enable objects or materials produced (or received) at an entry location to be temporarily stored in compartments in the storage racks prior to delivery to an exit location for transport elsewhere (i.e., inside or outside the factory or warehouse). The objects or materials may be manufactured parts or various other products or may be containers filled with such parts or products. The compartments in the storage racks are adapted, as the situation requires, to receive and directly support parts or products of particular configuration (i.e., such as large automobile subassemblies) or to receive and support containers filled with parts or products. Typically, the object or load is loaded onto an automatic guided vehicle at the entry location and automatically transported thereby along a rail network to the end of an aisle in which a self-propelled aisle crane is located. The crane has an extendable/retractable shuttle thereon, which receives the object or load from the AGV and stores it in a storage rack compartment. When needed, the aisle crane retrieves the object or load from the compartment and delivers it to an empty available automatic guided vehicle at the end of an aisle which transports it to the exit location.

In some factories, parts or sub-assemblies are produced at one location and are temporarily stored in storage racks until needed at some other location where they are further processed or installed in larger assemblies. The ability to maintain a buffer inventory in temporary storage accommodates differences between production rates and installation rates, facilitates better scheduling and product flow and reduces idle inventory.

Important considerations in the design and arrangement of such systems and apparatus are: economical use of rack floor space, aisle space and overhead space; economical use of time in transporting, storing and retrieving the objects; ability to quickly identify and retrieve various types of objects which are stored in various compartments (use of "first-in-first-out" and "last-in-last-out" inventory concepts is one solution); minimizing the time and distance of movements of aisle cranes and guided vehicles during transport, storage and retrieval operations; planning for non-interfering movements between aisle cranes and guided vehicles; reduction of the number of costly aisle cranes required without sacrificing storage capacity or introducing delays; and provision for "parking" inactive aisle cranes and guided vehicles in non-interfering locations.

SUMMARY OF THE INVENTION

A system and apparatus in accordance with the present invention (FIG. 1) comprises an entry location 5 where objects or loads, such as containers 13, enter the system; an exit location 6 where they leave the system; and a storage zone 7 between the two locations wherein a plurality of storage racks 12 are located, each storage rack having a plurality of storage compartments 21 therein. The system and apparatus further comprises at least one, but preferably a plurality of, self-propelled aisle cranes 15 operable in an aisle 14 in the storage zone; a track or rail network or system 11, including track switches 51, extending between the entry and exit locations and through and around the storage zone; at least one, but preferably a plurality of, self-propelled automatic guided vehicles 10 movable on the rail network and cooperable with the aisle crane(s); and control means for the aisle crane(s), the guided vehicle(s), and the track switches.

Each storage rack 12 (FIGS. 1, 2, 3) has a front side confronting the side of an aisle 14, a rear side, an upper end, a lower end, and opposite ends. The compartments 21 in each storage rack 12 are generally arranged in horizontal rows and vertical columns and objects or loads are inserted into and removed from the compartments from the front side of the rack.

Figure 1:
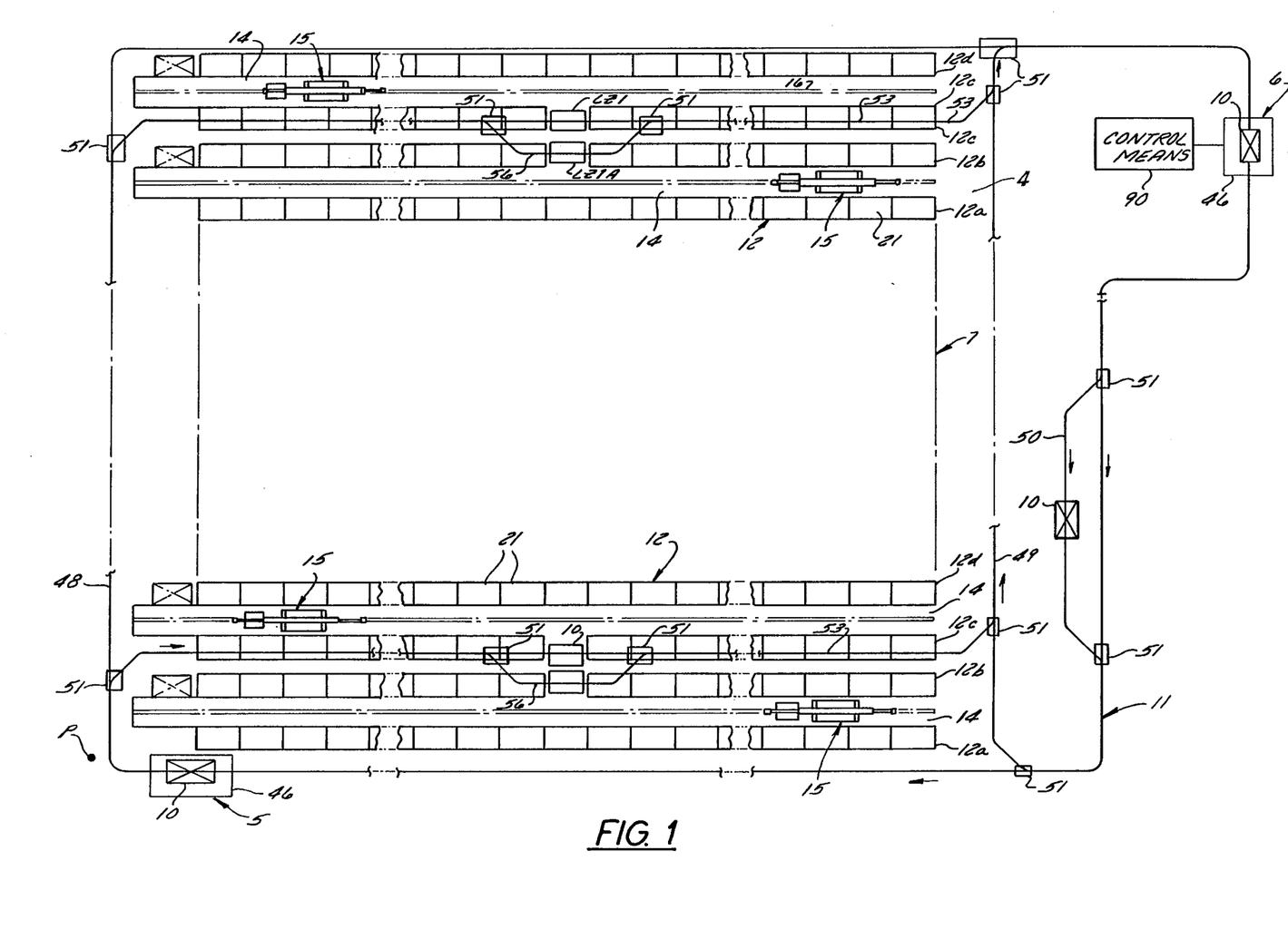
FIG. 1 is a schematic top plan view of a preferred embodiment of a system and apparatus in accordance with the invention and comprising storage racks, aisle cranes, guided vehicles and a track network for the guided vehicles.
Figure 2:
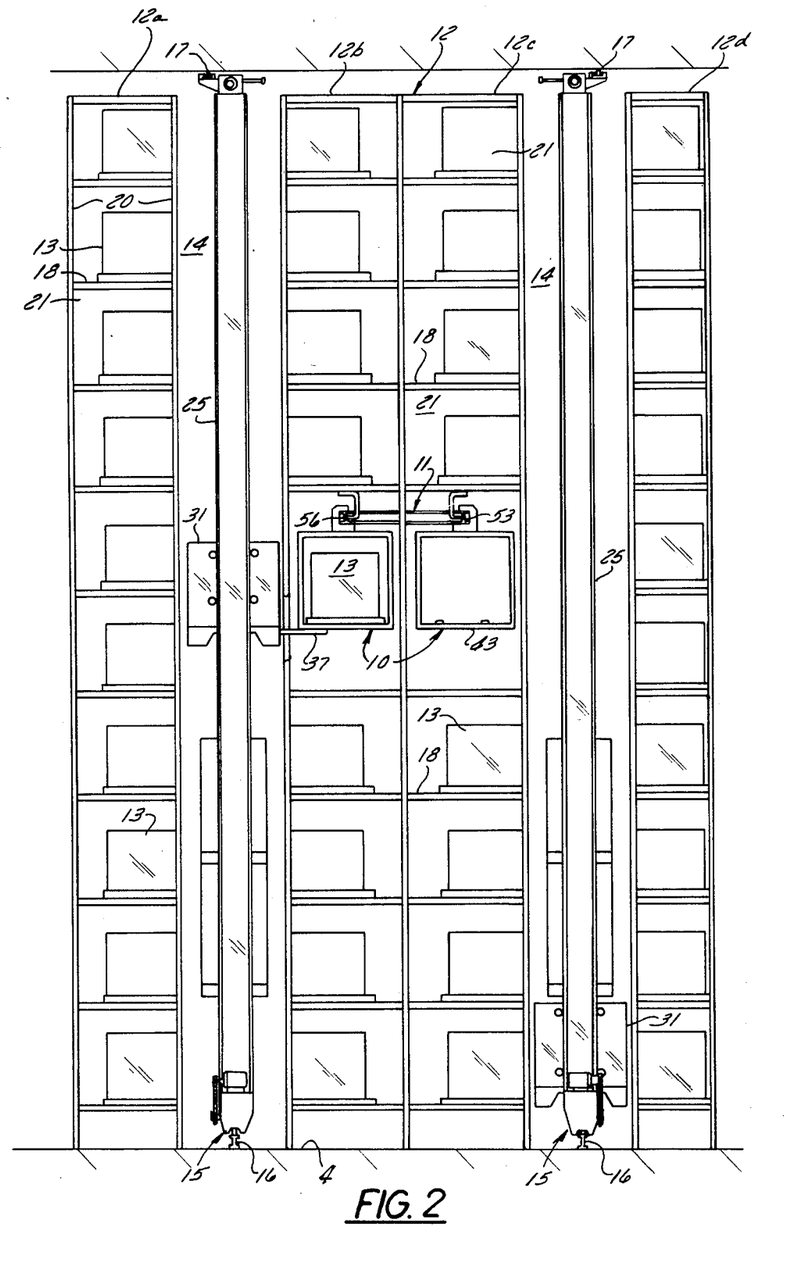
FIG. 2 is an enlarged end elevation view, partly in cross-section, of storage racks taken on line 2—2 of FIG. 1.
Figure 3:
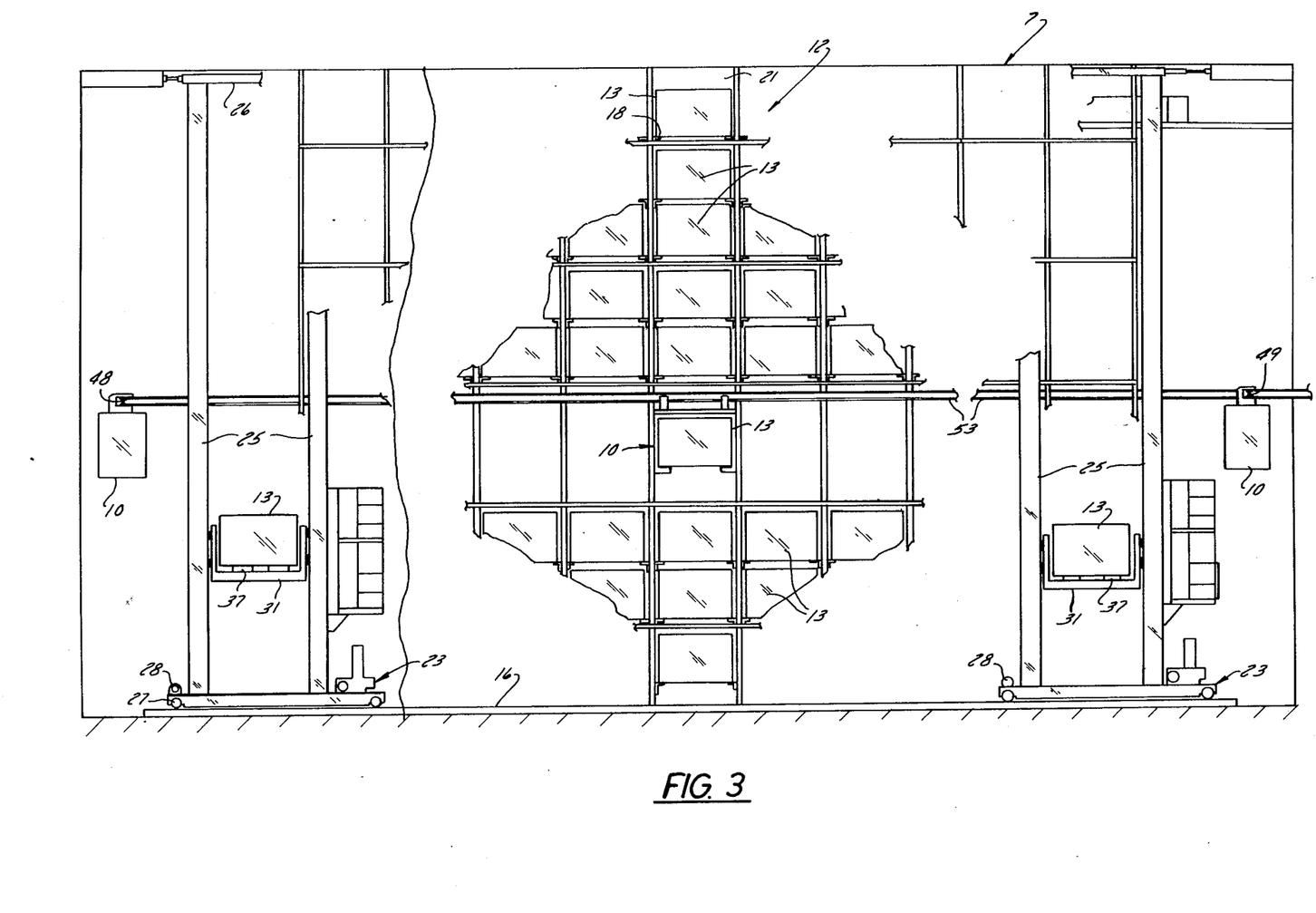
FIG. 3 is a front elevation view of a storage rack, with portions broken away, taken on line 3—3 of FIG. 1.

The plurality of storage racks are arranged in sets of four so as to define two aisles 14, each aisle 14 accommodating one aisle crane 15. More specifically, a first rack 12a is disposed along one side of a first aisle 14 so that the front side of the first rack 12a confronts the first aisle. A second rack 12b is disposed along the opposite side of the first aisle 14 so that the front side of the second rack confronts the first aisle. A third rack 12c is disposed along one side of a second aisle 14 (parallel to the first aisle 14) so that the front side of the third rack 12c confronts the second aisle and so that the rear side of the third rack 12c confronts the rear side of the second rack 12b in back-to-back relationship. A fourth rack 12d is diposed along the opposite side of the second aisle 14 so that the front side of the fourth rack 12d confronts the second aisle.

Each aisle crane 15 (FIGS. 3, 4, 5) comprises a chassis or truck 23 which is selectively movable horizontally in opposite directions in its respective aisle 14 and can be stopped adjacent any vertical column of storage compartments 21 in the two racks 12 confronting that aisle. Each aisle crane 15 also comprises a carriage 31 which is selectively movable vertically in opposite directions on a mast 25 on its respective chassis and can be stopped adjacent any horizontal row of storage compartments 21 in the two racks 12 confronting that aisle 14. Each aisle crane 15 also comprises a shuttle 37 which is mounted on carriage 31 and is selectively movable horizontally (and perpendicular to its respective aisle) between a retracted position and either of two extended positions (FIG. 4), i.e., one extended position is into a storage compartment 21 of the rack 12 on one side of its aisle 14 and the other extended position is into a storage compartment of the rack 12 on the opposite side of its aisle 14.

The track or rail network 11 on which the guided vehicles 10 are selectively movable preferably takes the form of an overhead monorail system and comprises several track "lines" which are interconnected by track switches 51 which are selectively operable to direct each self-propelled (but selectively movable) guided vehicle 10 to desired locations for various purposes. Track lines, hereinafter sometimes referred to as main lines 53, extend through the aforementioned storage zone 7 to service the aisle cranes 15 associated with sets of storage racks 12. Preferably, a guided vehicle 10 moves only in one direction along a main line. Thus, an object, such as container 13, can be exchanged between a guided vehicle 10 and an aisle crane shuttle 37 either to enable delivery of an object unloaded from a guided vehicle 10 to the shuttle 37 for storage thereby in a storage compartment 21, or to enable retrieval of an object from a storage compartment 21 by the shuttle 37 and delivery thereof to a guided vehicle 10 (i.e., loaded onto the vehicle).

In accordance with the invention, one main line 53 extends through one (12c) of the back-to-back storage racks in a set, pre-emptying an intermediate horizontal row of compartments therein. A location along the main line 53, intermediate the opposite ends of that storage rack (and also intermediate the upper and lower ends of the storage rack), serves as a main unloading-/loading zone LZ1 whereat a guided vehicle 10 stops. In all embodiments disclosed herein, the main unloading/loading zone LZ1 is also accessible to the extended shuttle 37 of at least one aisle crane 15, i.e., that crane immediately adjacent the storage rack through which the main line extends. The position along an aisle whereat the shuttle 31 of an aisle crane 15, if extended while the crane is stopped, has access to an associated guided vehicle unloading/loading zone, is referred to as the "shuttle home position" (FIG. 2).

In one embodiment (FIG. 1), the main line 53 is provided with a short parallel spur track 53 which is connected thereto by selectively operable track switches 51. The spur track 56 extends through a portion of the other back-to-back storage rack (12b) in the set (pre-emptying a portion of an intermediate horizontal row of compartments therein) and defines an auxiliary unloading/loading zone LZ1A whereat a guided vehicle 10 stops and which is accessible to the shuttle 37 of the other aisle crane 12 for that set of storage racks.

In a second embodiment (FIG. 11), the main line 53 is disposed so that the main unloading/loading zone LZ3 is accessible to the shuttle 37 of both aisle cranes 12 for a set of storage racks and, therefore, no spur track or auxiliary unloading/loading zone is required.

In a third embodiment (FIG. 12), two parallel main lines 53 and 153 are provided for a set of storage racks, each main line extending through one of the back-to-back storage racks 12c and 12b in the set, and each having its own main unloading/loading zone LZ4 and LZ5 which, however, is accessible by only one aisle crane 15.

Figure 10:
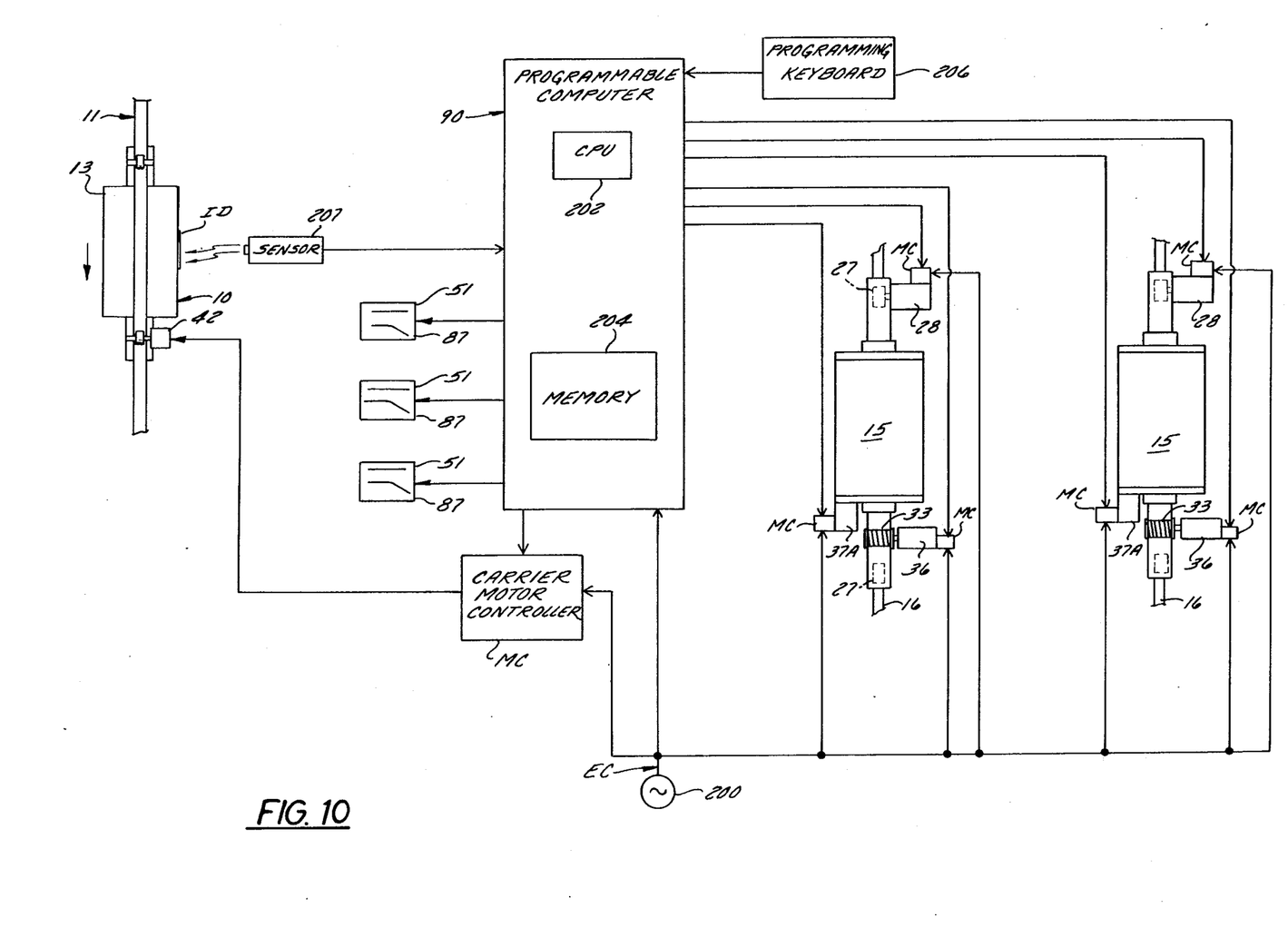
FIG. 10 is a schematic diagram of the control means for the embodiment of the system and apparatus of FIG. 1.

In each aisle crane 15, the chassis 23, the carriage 31 and the shuttle 37 is operated by its own independently operable motor and each guided vehicle 10 is driven by its own independently operable motor. These motors and the selectively operable track switches 51 are controlled by control means (FIG. 10). The control means comprise an identification device or tag ID which is physically mounted on each object (i.e., container 13) entering the system and contains electronically-readable unique data specific to each object. The control means also comprise a plurality of electronic sensors 207 located at fixed points in the system for reading the data on the tag moving therepast and for providing an electronic output signal penetrating thereto. The control means further comprise an electronic programmable computer 90 which receives data from three sources, namely: from a program built into the computer or supplied thereto; from an operator's keyboard 206; and from the output signals from the sensors 207. The computer 90 operates to direct specific objects (i.e., containers) to specific unloading/loading zones and to effect storage in specific storage compartments 21; and to retrieve specific objects from specific storage compartments and to deliver them to guided vehicles 10 for routing to specific locations.

Storage and retrieval systems in accordance with the invention and apparatus therefor offer numerous advantages over the prior art.

For example, each set of four racks is very compact. Any desired number of sets can be used to define the storage zone. The "home position" of each aisle crane shuttle is such that the distance therefrom to any storage compartment of its associated rack or racks is always less than the length of the associated aisle (i.e., possibly up to one-half) and less than the height of the rack or racks (i.e., possibly up to one-half) and this results in substantial time reduction in storage and retrieval operations. Guided vehicles not in use are stored or parked on the track network outside of the storage zone and do not interfere with expeditious movement of the active vehicles or cranes. One main track can service two aisle cranes, and two cranes can service up to four racks resulting in economies in space requirements and equipment costs. In one preferred embodiment, location of the main track within the confines of one row of one of four racks and location of its spur track within the confines of a small portion of another rack, results in space conservation above and alongside the racks, without undue sacrifice of storage capacity, and, indeed, makes space above the racks (if any) available for additional storage compartments, as compared to prior art systems. Moving the guided vehicles along the main track in only one direction eliminates conflict, promotes efficiency and speeds up product flow-through in the system. The control means processes information pertaining to the type of object, object location and storage compartment availability in such a manner as to make the most efficient and expeditious use of available storage capacity in a minimum amount of time. Other objects and advantages will hereinafter appear.

DETAILED DESCRIPTION OF PREFERRED EMBODIMENTS OF THE INVENTION

Referring to FIG. 1, there is shown a first embodiment of apparatus embodying the principles of this invention installed in a factory or plant that has at least one origin or entry location 5 at which materials or objects move into the system, a destination or exit location 6 that may be an assembly line at which the materials are assembled into finished products or subassemblies, and a storage zone 7 for buffer storage of materials that are ready for assembly. At some times materials received or produced at the origin location 5 must be transported directly to the destination location 6 to meet immediate needs; at other times they must be transported from the origin location 5 to the storage zone 7 to be retained there in temporary storage; and at still other times materials must be retrieved from storage and transported from the storage zone 7 to the destination location. There may also be times when two or more of these transport requirements must be satisfied simultaneously.

It will be understood that there may be two or more origin locations 5, comprising, for example, presses and other metal working machines and/or unloading docks, and similarly there may be two or more destination locations 6; but as the description proceeds it will be obvious how the principles of this invention can be adapted to such cases.

In general, the transport and storage apparatus of this invention comprises a number of self-propelled track-supported automatic guided vehicles 10, a track network or system 11 on which the vehicles are supported and by which they are guided for travel between storage zone 7, origin location 5 and destination location 6, a plurality of sets of elongated upright storage racks 12 supported on the floor 4 in the storage zone 7 that are arranged to define a number of aisles 14, as hereinafter described, and an aisle crane 15 for each aisle 14, each such crane being mounted on tracks 16, 17 that extend along the length of its aisle and being self-propelled for movement in each direction along its tracks.

Each of the racks 12 comprises a number of vertically spaced apart shelves 18. With certain exceptions that are pointed out below, every shelf 18 extends along the full length of its rack, and the shelves of each rack are preferably spaced apart at uniform vertical intervals. Each rack also comprises upright members 20 by which its shelves are supported. The upright members 20 can be either posts or partition walls, depending upon the weight and character of the materials to be stored in the rack, but in any case they are preferably spaced apart at uniform horizontal distances to cooperate with the shelves in defining numerous, preferably identical, compartments or bins 21 in the rack, all opening to its front side, arranged in horizontally extending rows and vertical columns.

The racks 12 in the storage zone are arranged in sets of four, each set comprising two pairs of racks 12a-12b and 12c-12d, all of which extend lengthwise parallel to one another. The two racks 12a-12b and 12c-12d of each pair are laterally spaced apart to define an aisle 14 across which their front sides face each other. Each aisle 14 is just wide enough for its storage and retrieval machine 15 to move along it with a small clearance from the racks at its opposite sides.

In each rack set 12a-12d, the two middle racks 12b and 12c are back-to-back adjacent to one another, and those two racks thus front on neighboring aisles 14. With a storage zone 7 comprising several sets of racks 12 as here illustrated, each of the outer racks 12a and 12d of each set will also be back-to-back adjacent to an outer rack 12d and 12a, respectively, of an adjacent set. It will be apparent that back-to-back racks 12a,12d and 12b,12c can be rididly connected with one another for mutual support.

Figure 4:
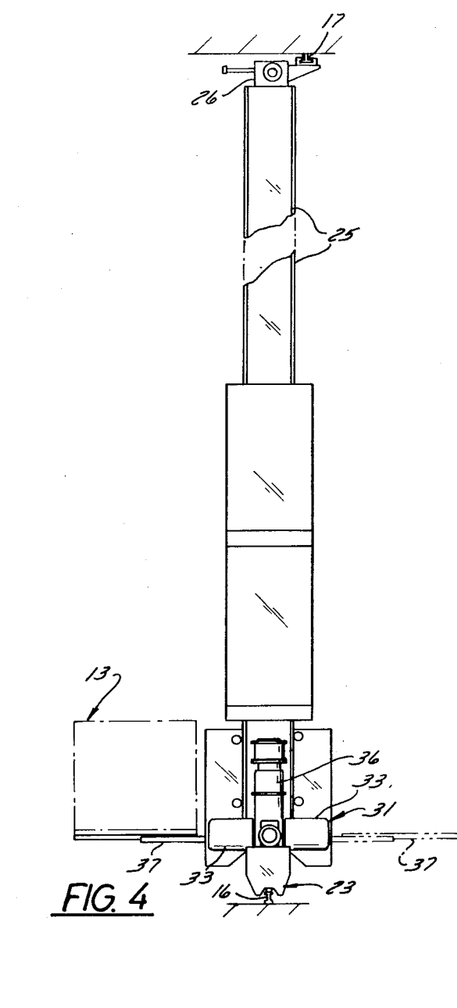
FIG. 4 is an end elevation view of an aisle crane of FIG. 1 showing the shuttle thereon.
Figure 5:
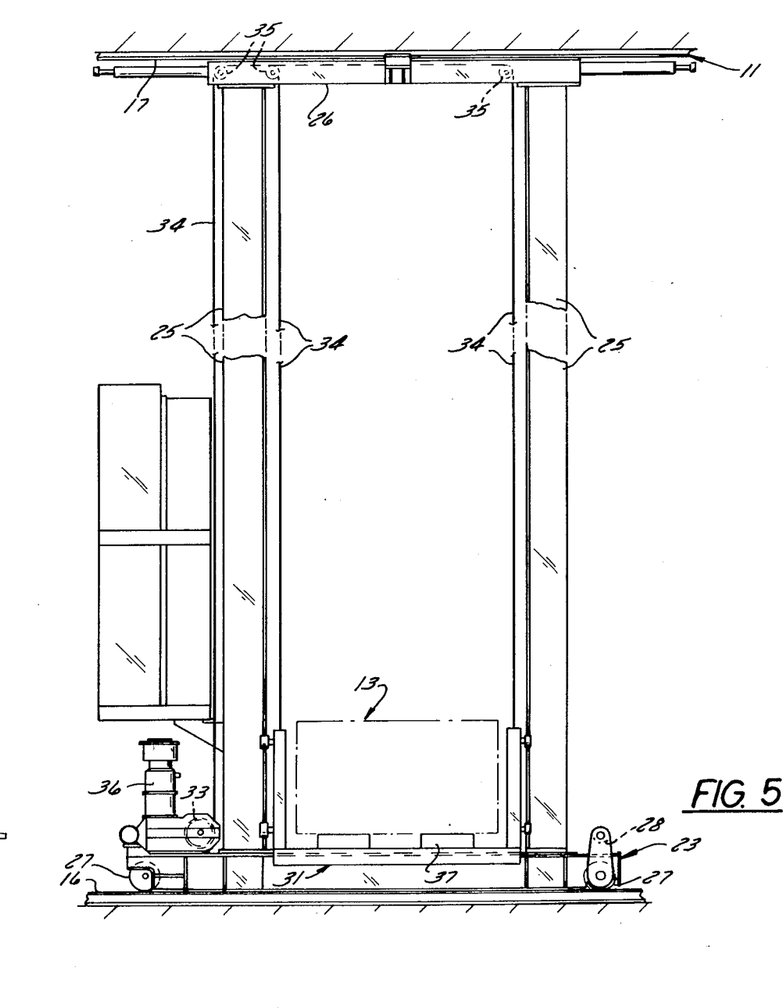
FIG. 5 is a side elevation view of the aisle crane and shuttle of FIG. 4.
Figure 6:
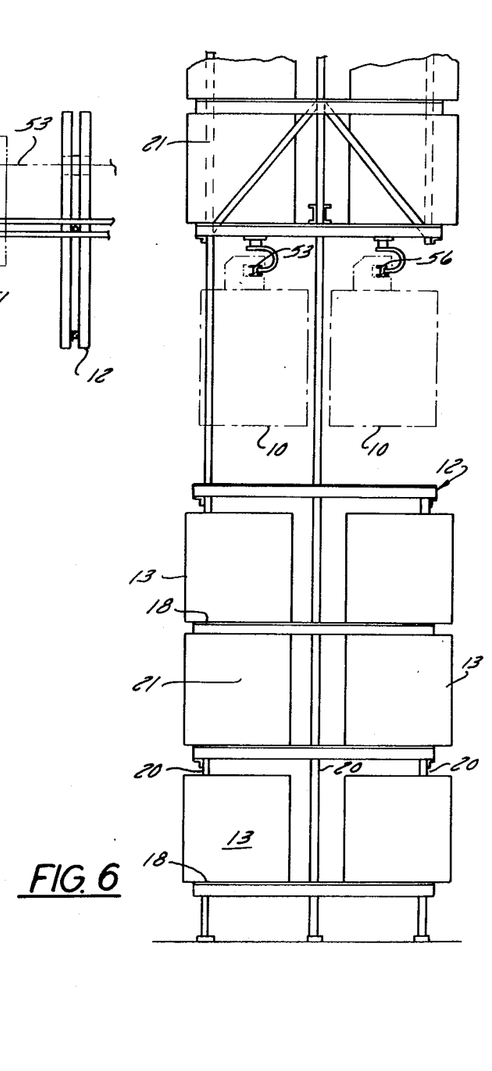
FIG. 6 is an end elevation view of two back-to-back storage racks and showing in cross-section a portion of the track network therein.

The aisle crane 15, which is adapted for storage and retrieval of objects or loads, for each aisle 14 can be a double-masted stacker crane of the general type disclosed in U.S. Pat. No. 4,358,239, issued to M. J. Dechantsreiter in 1982 and assigned to the assignee of this application. In general, aisle crane 15 has a chassis which is confined to movement in opposite directions along its aisle 14 and which comprises a lower truck 23 that is elongated in the direction of travel, a pair of masts 25 which projects up from the lower truck and are spaced apart in said direction, and a trolley or upper truck 26 that bridges across the tops of the masts. The lower truck 23 has wheels or rollers 27 which engage a lower rail 16 that extends along the aisle 14 at floor level. For propulsion of the chassis at least one of the wheels 27 is driven from a reversible motor 28 that is mounted on the lower truck. The trolley 26, as here shown, has sliding engagement with an overhead rail 17 that parallels the lower rail 16, to hold the machine upright.

A carriage 31 between the masts 25 is guided by them for up and down motion relative to the chassis and is raised and lowered by means of a motor driven winch 33, driven by motor 36, on the lower truck 23, connected with the carriage by means of cables 34 that are trained over pulleys 35 on the upper truck. A slide or shuttle 37 on the carriage is extendable relative to it in opposite horizontal directions transverse to the aisle, for moving materials onto and off of shelves of the compartments 21 at each side of the aisle. The slide or shuttle 37, operated by a motor 37A, can be of the type that is fully disclosed in U.S. Pat. No. 3,586,194, issued in 1971 to M. J. Dechantsreiter, which is assigned to the assignee of this application and to which reference can be made for details of the shuttle.

By movement along the rails 16, 17, aisle crane 15 can be brought to a position in which its carriage 31 is aligned with a column of bins or compartments 21 in each of the racks fronting on its aisle, and by its vertical movement the carriage can be brought into alignment with a selected compartment in one of those racks, whereupon the shuttle is extendable partway into that compartment to deposit material in it for storage or to retrieve material from it. The material is preferably on pallets or in containers that have low spaced-apart supports on their bottoms between which a tongue or fork of the shuttle can move to engage against the underside of the pallet or container and lift it slightly as the carriage 31 makes a small upward movement. During vertical travel of the carriage 31 and travel of the crane along its aisle the shuttle is in a retracted position in which it, and any load it is carrying, is centered between the racks which front on its aisle and is clear of those racks.

Figure 9:
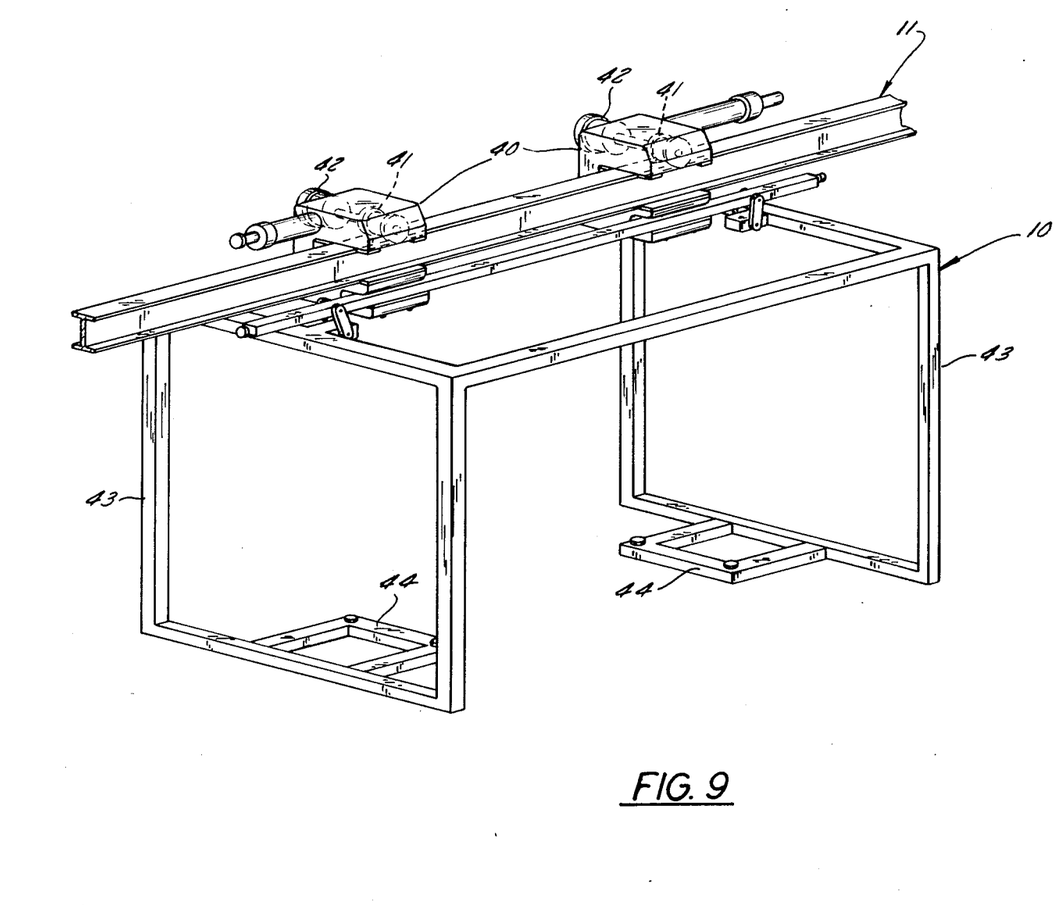
FIG. 9 is an enlarged perspective view of a guided vehicle of FIG. 1, FIG. 2, FIG. 3 and FIG. 7.

Each of the track supported guided vehicles 10 is preferably a monorail carrier cooperable with an overhead monorail track, although it could be adapted to operate on a track that underlies it. In any case each vehicle 10 is self-propelled and has a load supporting portion with which the aisle cranes 15 can cooperate and which, accordingly, is so arranged that a load comprising palletized or containerized materials, as in container 13, can be transferred onto and off the vehicle by substantially horizontal motion in either sideward direction, that is, transversely to the direction of vehicle travel.

Thus the preferred monorail guided vehicle has an upper trolley portion 40 which engages the overhead rail 11 for support, propulsion and guidance and on which there are drive rollers 41 and a motor 42 for propelling the carrier along the rail. It will be understood that the trolley also has conventional bumpers. The load supporting means of the vehicle comprises a pair of arms 43 which project down from its trolley portion 40 and which are spaced apart in the direction of its travel. Each arm 43 has at its bottom a shelf-like bracket portion 44 that projects horizontally partway towards the bracket portion on the other arm and cooperates with it in supporting a load that bridges across the bracket portions. As the carriage 31 of an aisle crane 15 makes a lifting movement, the tongue or fork of its extended shuttle can move up between the bracket portions 44 to engage the underside of a pallet or container on them and lift it slightly, after which the shuttle retracts to remove the load from the guided vehicle.

Preferably the monorail track system is arranged to define a loop whereby a guided vehicle can move from any point on the system to any other point on it by travel in only one direction. Obviously the system can have switched cutoffs that allow the guided vehicles to bypass portions of the loop for direct travel between various pairs of points in the system. For the most part the monorail track 11 is mounted at a relatively high level above the floor, so that the guided vehicles 10 will be well above traffic and operations on the floor; but at origin and destination locations 5, 6 there are elevator-like lift towers 46 of known type whereby carriers can be lowered to floor level for loading and unloading and raised back up onto the track system. Alternatively, fork lift trucks or the like can be employed for loading and un-loading the guided vehicles, so that the guided vehicles need not be raised or lowered and need not be equipped with a hoist mechanism.

At storage zone 7 track system 11 has a straight distribution stretch 48 which extends transversely to the lengths of the racks and is spaced a short distance in front of their front ends, and it has a collection stretch 49 which extends parallel to the distribution stretch but is spaced a short distance to the rear of the rear ends of the racks. In the following description it is assumed that the guided vehicles move from left to right along each of the distribution and collection stretches. Thus the left end of the distribution stretch 48 and the right end of the collection stretch 49 are connected with the transport trackage comprising the loop or loops whereby the vehicles are guided to the origin and destination locations. Preferably the track system also includes a parking stretch 50 which extends lengthwise parallel to the racks and which lies just outside the array of racks in the storage zone and has its opposite ends connectable by means of switches 51 with the distribution stretch 48 and with the collection stretch 49, respectively. The parking stretch 50 is in a suitable location for storage of guided vehicles that are temporarily not needed for transport of materials, and such vehicles can be switched onto it from the distribution stretch 48 and readily switched from it back onto the transport trackage by way of the collection stretch 49.

According to the present invention, the monorail track system 11 also includes a storage zone stretch or main track 53 for each set of four racks 12a–12d in the storage zone. Each storage zone stretch 53 extends lengthwise along the full length of one inner rack 12c of its set and, in effect, replaces or pre-empts two vertically adjacent rows of compartments in that rack, which rows are intermediate the upper and lower sides of the storage rack. At its opposite ends each storage zone stretch 53 is connectable by switches 51 with the distribution stretch 48 and with the collection stretch 49, respectively, so that a vehicle which has entered the distribution stretch 48 can be switched from it onto any selected one of the storage zone stretches or main tracks 53 and, after passing through the storage zone LZ1 on that storage zone stretch, can be returned to the transport trackage by way of the collection stretch 49. Each storage zone stretch 53 is so situated in its rack 12c that a vehicle on it is disposed wholly to the rear of the vertical plane containing the front edges of the shelves of that rack but is close to that plane and has its load supporting means 43, 43 at a level about midway between the highest and lowest shelves of that rack. Thus the load carrying means of a guided vehicle 10 supported on a storage zone stretch 53 fronts on an aisle 14 in the same manner as the compartments 21 of the rack 12c through which it extends and, like those compartments, is accessible for loading and unloading by the aisle crane 15 in the aisle 14 on which it fronts.

The "home" position of each aisle crane 15 is midway between the ends of its aisle. Therefore an aisle crane can go from its home position to any compartment fronting on its aisle, transfer a load to or from that compartment, and return to its "home" position, with a total travel distance which is never greater than the length of its aisle. The average distance for such round trips is equal to half the length of the aisle. The "home" position of the shuttle 37 of an aisle crane 15 is thus midway between the ends of the associated storage racks and midway between the upper and lower sides of the storage racks and similar travel and distance economies result during vertical shuttle travel.

A guided vehicle that enters any one of the storage zone stretches 53 for loading and/or unloading moves along that stretch to a position midway between the ends thereof, where it stops at a loading zone LZ1 to be directly adjacent and accessible to the shuttle 37 of an aisle crane 15 which is in its "home" position. A load can thus be transferred between the guided vehicle 10 and the shuttle 37 as soon as the guided vehicle stops and the shuttle is extended and retracted. If a load is transferred from the guided vehicle to the aisle crane, and the guided vehicle must wait to receive a load from a rack fronting on the same aisle, as will often be the case, the guided vehicle is idle for only a short time because of the relatively short distances that the aisle crane travels along the aisle. Similarly, because the load supporting means on the guided vehicle is at a level midway between the top and bottom shelves of the storage racks, the carriage 31 moves, on average, through only one-fourth of the height of the racks in transferring materials between a guided vehicle and storage. The system thus affords optimum utilization of both guided vehicles and aisle cranes, bearing in mind that the efficiency of the system can be measured in terms of the percentage of operating time during which guided vehicles and aisle cranes are in motion.

For each storage zone stretch 53 the monorail track system in the storage zone comprises a short spur stretch or track 56 which is at the level of its storage zone stretch and is situated in the rack 12b that is back-to-back with the rack 12c through which the storage zone stretch extends. Each spur stretch 56 extends through only a minor portion of the length of its rack 12b so that it displaces or pre-empts only a few of the compartments or bins in that rack; and it is at substantially equal distances from the opposite ends of that rack so that a guided vehicle on it is adjacent to the "home" position of the shuttle of the aisle crane for the aisle upon which the rack 12b fronts. The opposite ends of the spur stretch 56, which services a storage zone LZ1A, are connectable by switches 57 with the storage zone stretch 53 for its set of racks. Further, the spur stretch 56 is so situated in relation to the rack 12b in which it extends that a guided vehicle 10 on it is disposed wholly to the rear of the vertical plane containing the front edges of the shelves of that rack 12b but is close to that plane. Thus a guided vehicle entering the storage zone LZ1 on a storage zone stretch 53 can continue to the midpoint of that stretch, to be loaded and/or unloaded there by the aisle crane that serves the racks 12c and 12d of its set, or it can be switched over to the spur stretch 56 for its set of racks, on which it can be loaded and/or unloaded at a storage zone LZ1A by the aisle crane that serves the racks 12a and 12b of its set. In effect, there are two storage zones or storage zone regions, one (LZ1) for track 53 and one for spur 56 (LZ1A).

It will be apparent that even though guided vehicles 10 are routed through the storage zone 7 in the apparatus of this invention, for efficient cooperation with the aisle cranes 12, only a relatively small portion of the total volume of the storage zone 7 is dedicated to accommodating the guided vehicles 10 and their track-network 11, and storage density in that zone 7 is high.

Figure 7:
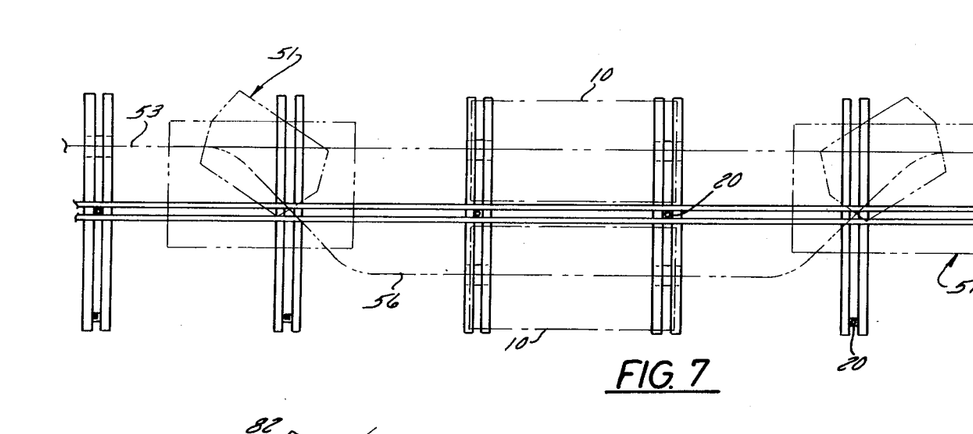
FIG. 7 is an enlarged top plan view of a portion of the track network of FIG. 1, FIG. 2, FIG. 3 and FIG. 6.
Figure 8:
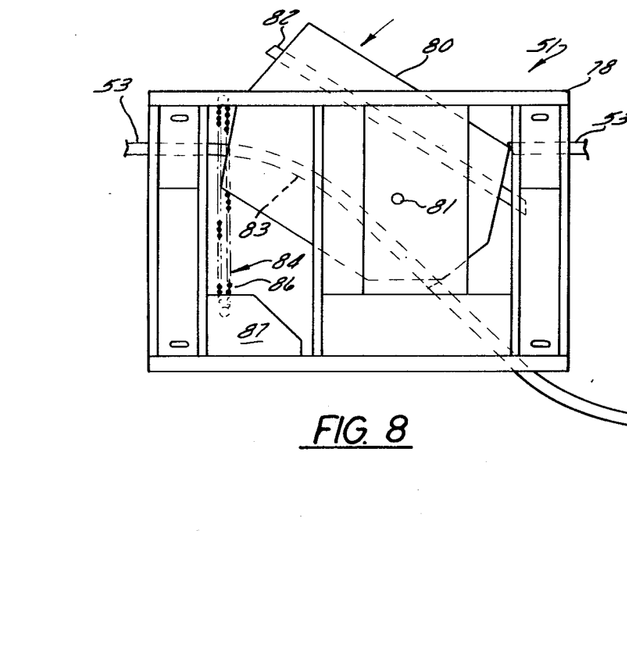
FIG. 8 is an enlarged top plan view of a track switch of the track network which is shown schematically in FIG. 1 and FIG. 7.

Referring to FIGS. 7 and 8, the switches 51 are substantially identical in construction and mode of operation and each is independently switchable between two positions by the control means. As FIGS. 7 and 8 show, a switch 51 for main track 53 and spur track 56 comprises a rigid stationary support frame 78 which adapts it for overhead mounting on the racks in which it is employed. A turntable 80 is mounted on support frame 78 for pivotal movement in a horizontal plane between two positions about a pivot pin 81. A short straight track section 82 and a short curved track section 83 are rigidly mounted on and movable with turntable 80. Turntable 80 is pivotably movable between its two positions by a linkage 84, including a biasing spring 86 connected between turntable 80 and an electrically operated switch actuator 87. In switch 51, when switch actuator 87 is de-energized (i.e., not actuated), spring 86 biases and maintains turntable 80 to an unswitched position (FIG. 7) wherein straight track section 82 joins the ends of main track 53. However, when switch actuator 87 is energized (i.e., actuated, it causes turntable 80 to rotate against the bias of spring 86 to a switched position shown in FIG. 8 wherein curved track section 83 joins the end of main track 53 to the curved end of spur track 56. Actuator 87 is actuated by the control means, as hereinafter described. However, it is to be understood that a switch 51 could be installed so that, when not actuated, it is maintained in whichever of its two positions is most efficient, in view of the frequency and routing of guided vehicles 10 moving therethrough.

CONTROL MEANS

Referring to FIG. 10, the control means for operating a system and apparatus in accordance with the invention comtemplates a suitable source 200 of electrical power for energizing the guided vehicle propulsion motors 42, the aisle crane propulsion motors 28, the shuttle winch or lift motors 36, the shuttle extend/retract motors 37A, the track switch actuators 87, and a programmable controller 90. Such electrical power is delivered to a respective motor or switch actuator from source 200 through electrical conductors generally designated EC and shown schematically in FIG. 10 and through motor controllers generally designated MC in FIG. 10. The conductors EC take the form of insulated wires and cables, where appropriate. For the guided vehicles and aisle cranes, the conductors EC take the form of electrically conductive, uninsulated portions of the tracks and rails on which they move.

The programmable controller 90 includes a central processing unit (CPU) 202 and memory circuits 204 connected thereto. The controller 90 is preprogrammed and is provided with operating data in the form of electrical signals from sensors 207 and from a programming keyboard 206 (in some cases). Each sensor 207 is a commercially available device which is adapted to sense or read optical or radio frequency data on or emanating from identifier tag ID and provide corresponding electrical signals to programmable controller 28. Programmable controller 28 receives, stores and processes data therein so as to effect appropriate identification, routing, scheduling, storage, selection, retrieval and exchange of the materials and the objects in the system.

TYPICAL OPERATION

In a typical single cycle of operation of the embodiment of FIG. 1, a loaded container 13 with an identifier tag ID thereon is placed on a guided vehicle 10 at entry location 5 and is transported thereby into storage zone along whichever main track 53 is designated by the controller as desired and to whichever loading zone LZ1 or LZ1A is designated and stops thereat. On the way (at point P), a sensor 31 reads tag ID and the data thereon is stored in programmable controller 90 in order to make the above designations and for future reference. Whichever aisle crane 15 has access to the designated loading zone either remains in or returns to its home position and its shuttle 37 operates to remove loaded container 13 from the guided vehicle 10 at the loading zone, whereupon the now-empty guided vehicle 10 returns by the shortest route either to entry location 5 for a new container or, if un-needed, to parking stretch 50. Programmable controller 90 is programmed to "know" the address of each compartment 21 and "remembers" the status (empty or full) of each compartment based on previously-entered data (from shuttle movement). It directs the appropriate aisle crane 15 and its shuttle 37 with the loaded container 13 thereon, either to a pre-selected compartment 21, or to whichever empty compartment 21 is nearest the home position of the operative aisle crane, depending on the program. The shuttle 37 then operates to deposit its loaded container 13 into the selected compartment 21 and the aisle crane and its shuttle return to home position. Programmable controller 90 updates itself to "remember" that a specific container 13 (with specific objects) is in a specific compartment 21. To retrieve a specific loaded stored container 13, a request therefor is entered into programmable controller 90 from a signalling device 207 near exit location 6. The controller 90 determines container location and then directs the appropriate aisle crane and shuttle from "home" position to the appropriate compartment 21, whereupon it retrieves the desired container 13 and returns with it to "home position. Programmable controller 90 directs an empty guided vehicle 10 to the appropriate loading zone for the operative aisle crane, if one is not already there. Then, the crane shuttle 37 is operated and the loaded container 13 is transferred to the guided vehicle 10 which is then directed to exit location 6 whereat the loaded container is removed from the guided vehicle. The empty guided vehicle 10 then returns either to entry location 5 for a new loaded container 13, or to parking stretch 50, or directly to another loading zone in storage zone 7 requiring its availability, depending on the programmable controller's instructions.

In an embodiment of the invention where, for example, presses at several work stations in a factory serve as the entry locations, empty containers are delivered to the presses, are eventually filled with a predetermined number of parts, and then transported to the racks for storage. Then, full containers are delivered to other work stations which serve as the exit locations and, when emptied, are returned. Signal information is transmitted to the programmable controller from signalling devices (not shown) at the individual work stations indicating the need for empty containers or full containers of specific parts. Signal information may be generated automatically or, for example, by a control switch (not shown) actuated by the press operator to signal his needs or may take the form of commercially available micro-computers. Thus, the programmable controller 90 "knows" that a particular part is needed (or produced) at a particular work station, that it is stored (or to be stored) in a particular compartment in a particular rack, and that a specific aisle crane, a specific guided vehicle and specific track switches are to be activated. To prevent total interruption of the system operation in the event that the programmable controller 90 is "down", or some equipment failure occurs at some point in the system, it is preferable to design and construct the programmable controller 90 as two units, each unit normally governing operation of specific work stations and specific aisle cranes, so that faults in one portion of the system will not interfere with operations in another portion. However, it is further desirable that these units be capable, if desired, of operating the entire system in case the other unit is "down", even if system operation is necessarily slower.

The idendification device or tag ID affixed to each container 13 contains, for example, the following information or data which is readable by the sensors 207 and supplied to the programmable controller: container number, type of parts in the container, and address of compartment where it is to be sent. The various sensors which the container passes are, in effect, decision points whereat container routing is controlled and the appropriate aisle crane is selected. However, only one such point P is shown in FIG. 1.

Various forms of inventory control may be utilized with respect to storage and retrieval of containers in the racks, depending on individual factory needs. Generally speaking, similar parts should be distributed among several racks so that, if one aisle crane is out of service, another aisle crane has access to the same parts. Or, it may be necessary to store parts so that similar parts in a particular batch or production run can be withdrawn from the compartments according to their sequence number to aid in trouble-shooting later on, if necessary.

As previously explained, the concept of a centrally-located home location for each aisle crane shuttle reduces its travel time during storage and retrieval. The programmable controller can, in some installations, be programmed in advance to further expedite operations by, for example, effecting retrieval of a load from a compartment which is close-by a compartment in which another load has just been stored, and before the shuttle is returned to home position.

The keyboard inputs to the programmable controller are normally employed to control overall system operation, but are used to override or correct for a particular malfunction, for testing repaired system compartments returning to service, and for monitoring system operations. The controller also provides a readout or log (preferably printed) of system conditions and includes various alarms.

ALTERNATE EMBODIMENTS

Figure 11:
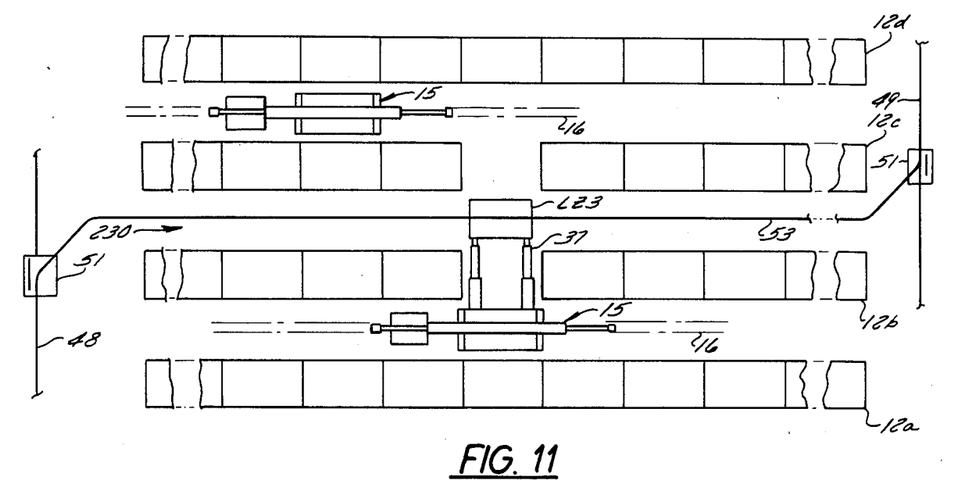
FIGS. 11 and 12 are schematic top plan views of portions second and third embodiments, respectively, of systems and apparatus in accordance with the invention.

FIG. 11 shows a first alternate embodiment which is similar to that depicted in FIG. 1, but which has only a single loading/unloading zone LZ3, instead of two separate loading zone regions as shown in FIG. 1. In FIG. 11, only main track 53 is required and no spur track, such as 56 in FIG. 1, is required. In FIG. 11, the shuttles 37 for the aisle cranes 15 are constructed so that each, when the shuttle is in "home" position, can be extended sufficiently to be able to exchange a container 13 with a guided vehicle 10 at the common loading zone LZ3. In FIG. 11, like FIG. 1, a space 230 is shown between the back sides of the containers in the back-to-back racks. It is to be understood that the racks themselves are back-to-back and that main track 53 extends entirely through a pre-empted row (or rows) in one of the racks. The embodiment shown in FIG. 11 is well-adapted for handling lighter objects (in view of the increased distance through which the shuttles 37 must be extended) but offers the advantage that a spur track 56 and switches 51 therefor are eliminated thereby reducing cost and complexity.

Figure 12:
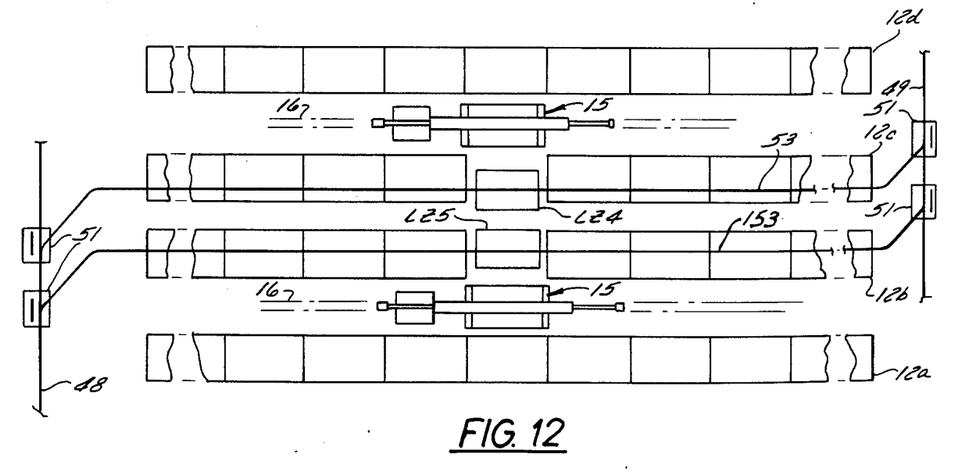

FIG. 12 shows a second alternate embodiment which is similar to that depicted in FIG. 1, but which has two parallel main tracks 53 and 153, instead of main track 53 and a spur track 56 as shown in FIG. 1. Loading zones LZ4 and LZ5 are associated with the main tracks 53 and 153, respectively. The storage rack 12b is required to dedicate an entire row of compartments to accommodate track 153. The advantage of the additional main track 153 is that a guided vehicle 10 thereon can by-pass a guided vehicle which is stopped at loading zone LZ4 without operation of spur track switches, which operation could delay departure of a guided vehicle.

From the foregoing description taken with the accompanying drawings it will be apparent that this invention provides economical and efficient apparatus for on-site transport and buffer storage of materials, which apparatus is particularly suitable for sites where manufacturing or assembly operations are conducted and where the quantity of materials in transit at any given time is high in relation to the quantity in storage. In addition to providing for a high rate of throughput and quick transfer of materials into and out of storage with a minimum investment in moving devices, the invention provides for high density storage in a storage zone and presents no interference to use of floor space outside the storage zone for other operations and traffic.

We claim:

1. Apparatus whereby materials can be transported between spaced apart locations and can be stored in and retrieved from a storage zone spaced from said locations, said apparatus comprising at least one set of elongated racks in said storage zone, each having a plurality of vertically spaced shelves extending therealong, each shelf having a front edge at a front side of the rack, there being two pairs of racks in said set, the two racks of each pair being laterally spaced apart to define an aisle between their front sides and one rack of one pair being back-to-back adjacent to a rack of the other pair, and a storage and retrieval machine for each aisle, each said machine comprising a chassis confined to motion lengthwise along its aisle, a carriage confined to vertical motion relative to said chassis and a shuttle on said carriage movable in opposite lateral directions for sliding material onto and off of shelves of the racks defining its aisle, said apparatus being characterized by:

A. at least one carrier having
 (1) truck means adapted to be movably supported on and guided by a track,
 (2) drive means whereby the carrier is propelled in a travel direction along a track that supports it, and
 (3) load supporting means with which said shuttle of each storage and retrieval machine is cooperable and to and from which materials can be transferred by substantially horizontal motion transverse to said travel direction;

B. a track for supporting and guiding said carrier, said track having
 (1) transport stretches extending between said storage zone and each of said locations,
 (2) a storage zone stretch extending along the length of said one rack of said one pair and situated to support the carrier
  (a) substantially wholly behind the front of that rack and
  (b) with its load supporting means at a level substantially midway between the highest and the lowest shelves of that rack, and
 (3) a spur stretch at substantially the level of said storage zone stretch, said spur stretch
  (a) extending along a minor part of the length of said rack of said other pair and substantially equidistant from the opposite ends thereof, and
  (b) being situated to dispose the carrier substantially wholly behind the front of the last mentioned rack; and C. switch track means cooperating with said storage zone stretch and said spur stretch to provide, alternatively and selectably, for straight-through travel of the carrier along the entire length of the storage zone stretch and for diversion of the carrier from the storage zone stretch to the spur stretch and back to the storage zone stretch, said carrier being a monorail carrier and said track being a monorail track at a substantial elevation above the level of the lowest shelves of said racks, said carrier being further characterized by:

(1) said truck means of the carrier being elongated in said travel direction;
(2) said load supporting means of the carrier comprising
 (a) a pair of arms which project down from said truck means and which are spaced apart in said travel direction and
 (b) a bracket portion on the bottom of each said arm that projects horizontally from the arm towards the bracket portion on the other arm, said bracket portions being cooperable to support a pallet or container that bridges across them and being spaced apart in said travel direction so that a tongue or fork on said shuttle can pass between them to engage the underside of the pallet or container.

2. Apparatus whereby materials can be transported between spaced apart locations and can be stored in and retrieved from a storage zone spaced from said locations, said apparatus comprising overhead monorail track having transport stretches extending between said storage zone and each of said locations and at least one monorail carrier having truck means adapted to be movably supported on and guided by said track, drive means whereby the carrier is propelled in a travel direction along said track and load supporting means beneath said truck means, said apparatus being characterized by:

A. a pair of racks in said storage zone, each having a plurality of vertically spaced shelves extending therealong, each shelf having a front edge at a front side of the rack, said racks being laterally spaced apart to define an aisle between their front sides;

B. a storage and retrieval machine comprising
 (1) a chassis confined to motion lengthwise along said aisle,
 (2) a carriage confined to vertical motion relative to said chassis, and
 (3) a shuttle on said carriage for sliding material on pallets and in containers onto and off of the shelves of said racks, said shuttle being movable in opposite lateral directions relative to the carriage and having tongues projecting in said lateral directions, each supportingly engageable with the undersides of pallets and containers;

C. said track having a storage stretch extending along the length of one of said racks and situated to support the carrier
 (1) substantially wholly behind the front side of that rack and
 (2) with its load supporting means at a level substantially midway between the highest and the lowest shelves of that rack; and D. said load supporting means of the carrier comprising
 (1) a pair of arms which project down from said truck means and which are spaced apart in said travel direction and
 (2) a bracket portion on the bottom of each said arm that projects horizontally from the arm towards the bracket portion on the other arm, said bracket portions being cooperable to support a pallet or container that bridges across them and being spaced apart in said travel direction so that a tongue on said shuttle can pass between them to engage the underside of the pallet or container.

3. The apparatus of claim 2, having a second pair of racks in said storage zone, substantially identical with said first described pair of racks and defining between them a second aisle along with a second storage and retrieval machine that is substantially identical to the first described storage and retrieval machine is movable, one of the racks of said second pair being back-to-back adjacent to said one rack of the first described pair, further characterized by:
  (1) said track further having a spur stretch at substantially the level of said storage zone stretch, said spur stretch
    (a) extending along a minor part of the length of said one rack of said second pair and being substantially equidistant from the opposite ends of that rack and
    (b) being situated to dispose a carrier thereon substantially wholly behind the front of the last mentioned rack; and
  (2) switch track means cooperating with said storage zone stretch and said spur stretch to provide, alternatively and selectably, for straight-through travel of the carrier along the entire length of the storage zone stretch and for diversion of the carrier from the storage zone stretch to the spur stretch and back to the storage zone stretch.

4. Apparatus wherein an object can be transported between spaced apart locations and can be stored in and retrieved from a storage zone spaced from said locations, said apparatus comprising:
  a plurality of storage racks in said storage zone,
  each storage rack having a top, a bottom, opposite ends, a rear side, and a front side;
  each storage rack having a plurality of storage compartments therein and each storage compartment having an access opening at the front side of its respective storage rack through which an object can be inserted and retrieved,
  a first one of said storage racks having its front side disposed along and confronting one side of a first aisle,
  a second one of said storage racks having its rear side disposed along and confronting the rear side of said first storage rack and having its front side disposed along and confronting one side of a second aisle;
  guide rail means connected between said spaced apart locations and comprising a first stretch extending longitudinally through said first storage rack between said opposite ends thereof and substantialloy parallel to said first aisle,
  said first stretch having a first loading zone therealong located between said opposite ends of said first storage rack,
  said guide rail means further comprising a spur stretch extending longitudinally through a portion of said second storage rack,
  said spur stretch having a second loading zone therealong located adjacent said first loading zone in said first storage rack;
  means for switchably connected and disconnecting said spur stretch to and from said first stretch;
  a self-propelled object carrier movable along said guide rail means into and out of said loading zones;
  a first storage and retrieval machine movable along a first path in said first aisle and having a first shuttle movable vertically relative to said first path and movable horizontally transversely to said first path into and out of the opening in said storage compartments in said first storage rack and into and out of said first loading zone,
  said first shuttle having a home position opposite said first loading zone,
  said first shuttle being operable to remove an object from said carrier when the latter is in said first storage zone and to store the object in a storage compartment in said first storage rack, and being further operable to retrieve an object from a storage compartment in said first storage rack and to deposit the object on said carrier when the latter is in said first storage zone;
  and a second storage and retrieval machine movable along a second path in said second aisle and having a second shuttle movable vertically relative to said second path and movable horizontally transversely to said second path into and out of the opening in said storage compartments in said second storage rack and into and out of said second loading zone,
  said second shuttle having a home position opposite said second loading zone,
  said second shuttle being operable to remove an object from said carrier when the latter is in said second storage zone and to store the object in a storage compartment in said second storage rack, and being further operable to retrieve an object from a storage compartment in said second storage rack and to deposit the object on said carrier when the latter is in said second storage zone.

5. Apparatus according to claim 4 wherein said plurality of storage racks further comprises another storage rack having its front side disposed along and confronting the opposite side of one of said aisles, and wherein the shuttle of the storage and retrieval machine in the said one aisle is further operable to store and retrieve an object in a compartment in said other storage rack and to remove and deposit an object on said carrier when the latter is in a storage zone associated with said one aisle.

6. Apparatus according to claim 4 wherein said plurality of storage racks further comprises a third storage rack having its front side disposed along and confronting the opposite side of said first aisle, and wherein said first shuttle of said first storage and retrieval machine is further operable to store and retrieve an object in a compartment in said third storage rack and to remove and deposit an object on said carrier when the latter is in said storage zone in said first storage rack.

7. Apparatus according to claim 6 wherein said plurality of storage racks further comprises a fourth storage rack having its front side disposed along and confronting the opposite side of said second aisle, and wherein said second shuttle of said second storage and retrieval machine is further operable to store and retrieve an object in a compartment in said fourth storage rack and to remove and deposit an object on said carrier when the latter is in said storage zone in said second storage rack.

8. Apparatus whereby an object can be transported between spaced apart locations and can be stored in and retrieved from a storage zone spaced from said locations and including a floor, said apparatus comprising:
  a first storage rack supported on the floor in said storage zone comprising a plurality of storage compartments arranged in horizontal rows and vertical columns,
  said first storage rack having a top, a bottom, opposite ends, a rear side, and a front side which is disposed along and confronting one side of a first aisle, each of said storage compartments having an access opening at said front side of said first storage rack through which an object can be inserted and retrieved;

guide rail means connected between said spaced apart locations and including a stretch extending longitudinally through a series of contiguous empty compartments of said first storage rack between said opposite ends thereof and intermediate said vertical height of the storage rack, said stretch extending substantially parallel to said first aisle and at substantially the same height above said floor along its length through the storage rack, said stretch of said guide rail means having a first loading zone therealong located between said opposite ends of said first storage rack, a self-propelled object carrier movable into and out of said loading zone along said guide rail means through a series of contiguous empty compartments of said first storage rack intermediate said vertical height of the storage rack and at substantially the same height above said floor along its movement through the storage rack;

and a first storage and retrieval machine movable along a path in said aisle and having a shuttle movable vertically relative to said path and movable horizontally transversely to said path into and out of the opening in said storage compartments and into and out of said loading zone, said shuttle having a home position opposite said loading zone, said shuttle being operable to remove an object from said carrier when the latter is in said storage zone and to store the object in a storage compartment, and being further operable to retrieve an object from a storage compartment and to deposit the object on said carrier when the latter is in said storage zone.

9. Apparatus according to claim 8 or 4 or 5 or 6 or 7 further comprising control means for operating a storage and retrieval machine and said carrier to effect movement of said carrier to and from a loading zone, to effect movement of a shuttle between its home position and any storage compartment in an associated storage rack, to operate a shuttle to effect exchange of an object between said carrier and a shuttle when said carrier is in a loading zone and a shuttle is in its home position and extending into the loading zone, and to operate a shuttle to insert or remove an object in a storage compartment.

10. Apparatus according to claim 9 wherein said control means operates to effect storage of an object by a shuttle in an empty compartment closest to the home position of the shuttle.

11. Apparatus according to claim 9 wherein said control means operates to effect retrieval of that one of a plurality of predetermined identical stored objects which is closest to said home position.

12. Apparatus according to claim 9 wherein said control means comprises:

a programmable computer;

a readable specific identifier for use in association with each specific object;

and sensor means connected to said computer for reading the identifier whereby said computer can effect routing of said object by a carrier and by a storage and retrieval machine.

13. Apparatus according to claim 8 further comprising a second storage rack having its front side disposed along and confronting the opposite side of said first aisle, and wherein said shuttle of said first storage and retrieval machine is further operable to store and retrieve an object in a compartment in said second storage rack and to remove and deposit an object on said carrier when the latter is in said storage zone in said first storage rack.

14. Apparatus wherein an object can be transported between spaced apart locations and can be stored in and retrieved from a storage zone spaced from said locations, said apparatus comprising:

a plurality of storage racks and a plurality of aisles in said storage zone, each storage rack having a top, a bottom, opposite ends, a rear side, and a front side;

each storage rack having a plurality of storage compartments therein and each storage compartment having an access opening at the front side of its respective storage rack through which an object can be inserted and retrieved, a first one of said storage racks having its rear side disposed along and confronting one side of a first one of said aisles, and its front side disposed along and confronting one side of a second one of said aisles;

a second one of said storage racks having its rear side disposed along and confronting a second side of said second aisle and having its front side disposed along and confronting one side of a third one of said aisles;

guide rail means connected between said spaced apart locations and comprising a first stretch extending longitudinally through said first storage rack between said opposite ends thereof and substantially parallel to said first aisle, said first stretch having a first loading zone therealong located between said opposite ends of said first storage rack, said guide rail means further comprising a spur stretch extending longitudinally through a portion of said second storage rack, said spur stretch having a second loading zone therealong located adjacent said first loading zone in said first storage rack;

means for switchably connecting and disconnecting said spur stretch to and from said first stretch;

a self-propelled object carrier movable along said guide rail means into and out of said loading zones;

a first storage and retrieval machine movable along a first path in said first aisle and having a first shuttle movable vertically relative to said first path and movable horizontally transversely to said first path into and out of the opening in said storage compartments in said first storage rack and into and out of said first loading zone, said first shuttle having a home position opposite said first loading zone, said first shuttle being operable to remove an object from said carrier when the latter is in said first storage zone and to store the object in a storage compartment in said first storage rack, and being further operable to retrieve an object from a storage compartment in said first storage rack and to deposit the object on said carrier when the latter is in said first storage zone;

and a second storage and retrieval machine movable along a second path in said third aisle and having a second shuttle movable vertically relative to said second path and movable horizontally transversely to said second path into and out of the opening in said storage compartments in said second storage rack and into and out of said second loading zone, said second shuttle having a home position opposite said second loading zone, said second shuttle being operable to remove an object from said carrier when the latter is in said second storage zone and to store the object in a storage compartment in said second storage rack, and being further operable to retrieve an object from a storage compartment in said second storage rack and to deposit the object on said carrier when the latter is in said second storage zone.

* * * * *